United States Patent [19]

Nass

[11] 4,333,767

[45] Jun. 8, 1982

[54] METHOD FOR THE MANUFACTURE OF AN ADHESIVE FROM ANIMAL BLOOD

[75] Inventor: Arno Nass, Hameln, Fed. Rep. of Germany

[73] Assignee: Bison-Werke Bahre und Greten GmbH & Co., KG, Springe, Fed. Rep. of Germany

[21] Appl. No.: 103,715

[22] Filed: Dec. 14, 1979

[30] Foreign Application Priority Data

Jan. 9, 1979 [DE] Fed. Rep. of Germany ....... 2900621

[51] Int. Cl.$^3$ ................................................ C09J 3/24
[52] U.S. Cl. ................................... 106/161; 156/336; 260/112 B
[58] Field of Search ................... 106/161; 260/112 B, 260/121; 156/336

[56] References Cited

U.S. PATENT DOCUMENTS 4,180,412 12/1979 Bünnig ................................ 106/161

Primary Examiner—Allan Lieberman

Assistant Examiner—Patricia Short

[57] ABSTRACT

A method for the manufacture of an adhesive from animal blood is described in which the blood is dried and stored as a dried mass of blood and in which this dried mass of blood is then converted to a sprayable solution of up to 40% concentration by the addition of water. The ready-to-use adhesive is finally prepared by the admixture, preferably during spraying, of a monobasic organic acid in a quantity sufficient to produce a pH value of the adhesive between 3.0 and 4.0.

In a modification of the method an extender or diluent preferably in the form of sodium chloride, is added to the blood prior to drying. The drying step can be carried out by means of vacuum drying, freeze drying or drying through atomization. It is also advantageous to cool the blood to a temperature of approximately 4° C. in the period between accumulation and drying.

The resulting adhesive is particularly suitable for use as a binder in the manufacture of particle board from wooden chips.

9 Claims, No Drawings

METHOD FOR THE MANUFACTURE OF AN ADHESIVE FROM ANIMAL BLOOD

The invention relates to a method for the manufacture of an adhesive from animal blood in which a monobasic organic acid is added to the blood immediately prior to the use of the adhesive and in a quantity sufficient to produce a ph value in the range from 3.0 to 4.0.

It is known to use adhesives manufactured from animal blood as a binder for the manufacture of cellulose containing wooden particle boards or the like and as a binder for cellulose containing boards which are to be coated with wood veneers or the like.

The early blood based adhesives, referred to as "blood albumen glues", required the mixing of several further substances in an alkaline environment and then only produced glues of low strength, and only very low wet strength, so that they were therefore unable to compete with synthetic resins as binders.

It has recently proved possible to develop an adhesive containing blood, or blood components, which has comparable characteristics to synthetic resin binders. An adhesive of this kind is obtained by the addition to the blood of a substance to inhibit the coagulation of the whole blood mass and by the further addition, directly prior to mixing of the whole blood mass with the cellulose containing particles, of a monobasic organic acid in a quantity such that a ph value in the range between 3.0 and 4.0 results. It is also already known in this connection to dry the mixture of blood and the coagulation inhibiting substance and to prepare it for use by mixing it with the acid in the above-mentioned manner with the addition of water. This mixing preferably takes place by supplying the blood and the organic acid separately to respective nozzles and mixing the components whilst they are being sprayed (DE-OS No. 27 15 501).

This known method as outlined above is unsatisfactory in that it is only possible to manufacture solutions of 13% concentration, in particular when working with dried blood, because the gelling process continues as a result of the acid component of the coagulation inhibiting substance and higher concentrations can no longer be sprayed. The ability to spray the solution is however a fundamental requirement for the practical use of the adhesive.

The adhesive quality of a blood based adhesive is heavily dependent on the solid matter concentration of the blood and when using this adhesive for the manufacture of cellulose containing wooden particle boards, a solid matter content of at least 12% is necessary in order to achieve the necessary adhesive strength. Thus, when using only 13% solutions for the manufacture of particle board, relatively moist particle mixtures result (moisture content for example 70%) which then have to be dried by the application of expensive energy to a moisture content at which pressing is possible.

The principal object underlying the invention is thus to so improve the initially mentioned method that sprayable solutions with a comparatively high solid matter content can be produced which are suitable for the manufacture of particle board and which make it possible to keep the particle moisture content after glueing sufficiently low that pressing can at once take place without a prior drying process.

This object is satisfied in accordance with the invention by firstly drying and storing the blood as a dry mass of blood, by subsequently converting this dried mass of blood by the addition of water to a sprayable solution of up to approximately 40% concentration and then adding the monobasic organic acid to this solution.

Preferably a diluent or extender is added to the blood prior to drying. Sodium chloride is particularly suitable as an extender or diluent and is expecially economically obtainable in the form of industrial common salt or indeed any basic inexpensive form of rock salt (Gewerbesalz). In addition to the function of an extender or diluent sodium chloride also takes over the function of a preservative and/or of a fungicide and thus hinders the onset of decomposition of the dried mass of blood. The blood is cooled in the period between accumulation and drying to a temperature of approximately 4° C. The afore-mentioned period can be of up to 50 hours duration but is however preferably of approximately 24 hours duration.

It is possible to manufacture sprayable solutions of up to 40% concentration from the dried blood mass which can for example be stored without problem in sacks. The dried blood mass is advantageously produced by vacuum drying or by freeze drying or by drying through atomization. These solutions of up to 40% concentration have a high solid matter content for example of approximately 12% and accordingly make it possible to provide an adhesive with optimum adhesive characteristics.

It is furthermore of decisive significance, particularly when using this blood based adhesive for the manufacture of cellulose containing wooden particle boards or the like, that it is possible to operate with low moisture values due to the relatively high percentage but nevertheless sprayable solutions. This makes drying procedures superfluous because it can be arranged without difficulty for the moisture content of the wood particles after the glueing operation to lie in the range from 26 to 28% which indicates that the mixture can be pressed at once.

Prior to drying approximately 20 to 50 gramms of sodium chloride per liter of blood is preferably added to the blood. This amount ensures that the desired sprayable solutions of up to 40% concentration can be manufactured without problem. It is also advantageous that the addition of organic acid significantly increases the cold glueing effect of the blood albumen which is of particular significance for the manufacturing process for the production of wooden particle boards in multi-storey installations.

An example will now be given for the manufacture of an adhesive from animal blood:

A solution of 39.8% concentration which can be sprayed without problem is formed from a dry blood mass of 396 kg, which contains an extender in the form of 80 kg of sodium chloride, by the addition of 600 kg water. During spraying an organic acid is added in order to achieve a ph value in the range from 3.0 to 4.0 and in order to start the gelling process. In the present case 300 kg of an organic acid of from 5 to 20% concentration are added and also serve to neutralize the odour.

The so formed blood based adhesive is used for glueing 3300 kg of wood chips having a moisture content of 5% so that after glueing a moisture content from 26 to 28% results. This mixture can at once be pressed without any preceding drying process.

The monobasic organic acid can for example be acetic acid or propionic acid or formic acid, or lactic acid or n-buteric acid or n-valeric acid or n-caproic acid or n-heptylic acid In comparison to the previously known method for the manufacture of a blood based adhesive significant advantages are achieved by the present invention. In the first place the use of inexpensive sodium chloride enables the direct manufacturing costs to be reduced. In addition the use of 40% solutions which are nevertheless freely sprayable means that a higher solid matter content and thus a higher adhesive effect can be ensured. Furthermore by working with high percentage solutions no additional drying processes are necessary for the manufacture of cellulose containing wood particle boards and thus the glued mixture of chips can be directly pressed with an attendant energy saving.

I claim:

1. A method of manufacturing an adhesive from animal blood comprising adding a diluent in the form of sodium chloride to the blood to form a mixture which is then dried and stored as a dried mass, converting said dried mass by the addition of water to a sprayable solution in the range from 13% up to approximately 40% concentration and then adding a monobasic organic acid to said solution in a quantity sufficient to produce a ph value in the range 3.0 to 4.0 to form the adhesive immediately prior to use thereof.

2. A method in accordance with claim 1 and wherein sodium chloride in an amount ranging from approximately 20 to 50 grams per liter is added to the blood prior to drying.

3. A method in accordance with claim 1 and wherein the drying step is carried out by vacuum drying.

4. A method in accordance with claim 1 and wherein the drying step is carried out by freeze drying.

5. A method in accordance with claim 1 and wherein the drying step is carried out by atomization drying.

6. A method in accordance with claim 1, wherein in the period between accumulation and drying, the blood is cooled to a temperature of approximately 4° C.

7. A method in accordance with claim 6, wherein said period has a duration of up to approximately 50 hours.

8. A method according to claim 6, wherein said period has a duration of substantially 24 hours.

9. A method in accordance with claim 1, wherein said adhesive is applied to cellulose containing material particles for the manufacture or particleboard.

* * * * *